March 24, 1931.   R. C. HOFFMAN   1,797,578
FRONT WHEEL DRIVE MOTOR VEHICLE
Filed Sept. 24, 1928    2 Sheets-Sheet 1
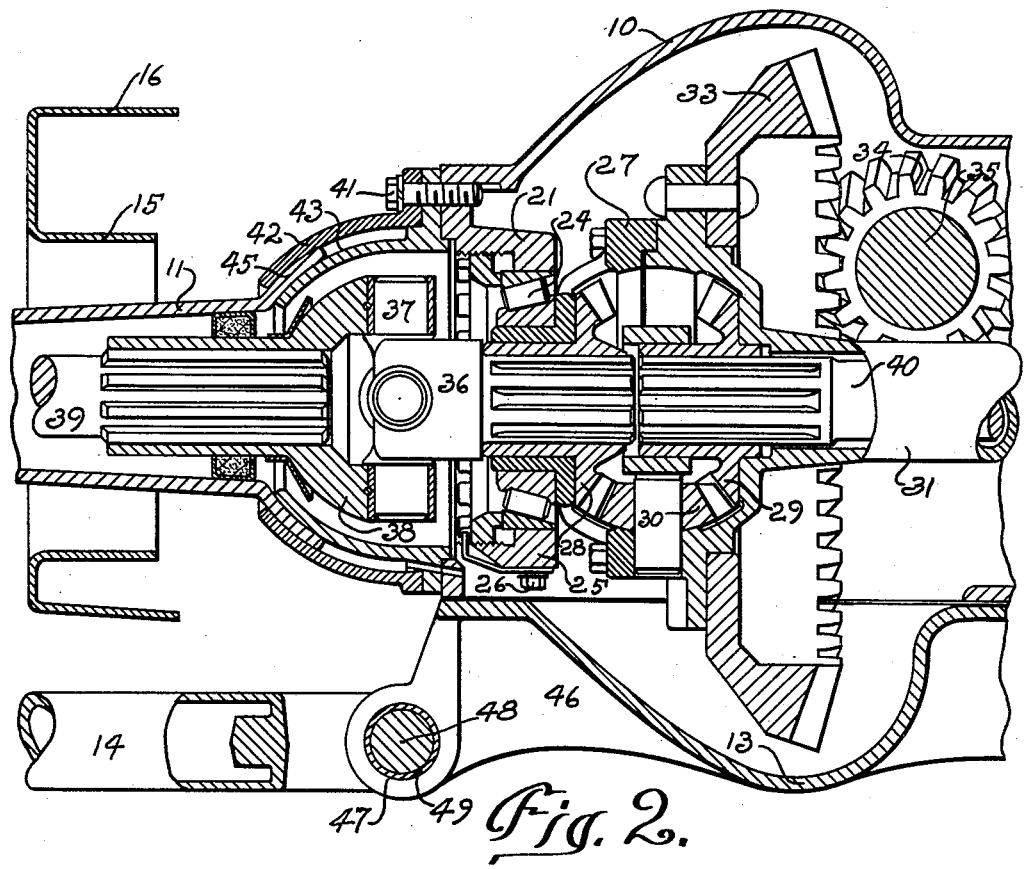
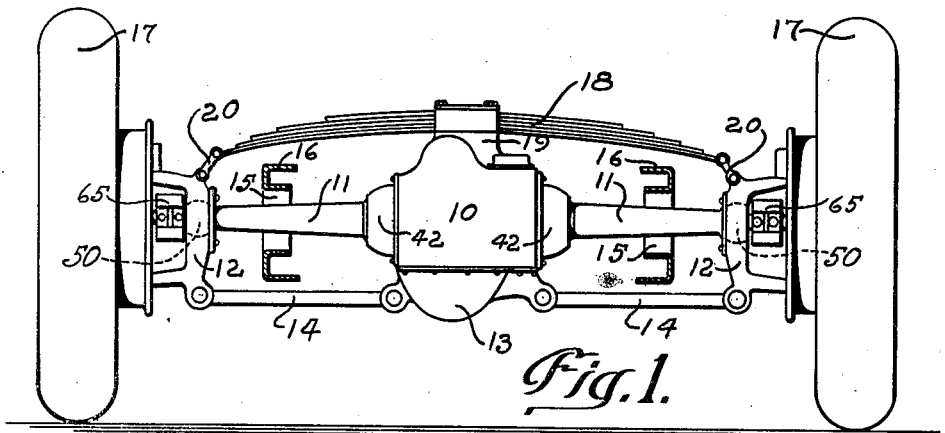
INVENTOR
ROSCOE C. HOFFMAN.
BY Harness, Dickey & Pierce
ATTORNEYS March 24, 1931.    R. C. HOFFMAN    1,797,578
FRONT WHEEL DRIVE MOTOR VEHICLE
Filed Sept. 24, 1928    2 Sheets-Sheet 2

INVENTOR
ROSCOE C. HOFFMAN.
BY
Harness, Dickey & Pierce
ATTORNEYS

Patented Mar. 24, 1931

1,797,578

UNITED STATES PATENT OFFICE

ROSCOE C. HOFFMAN, OF DETROIT, MICHIGAN

FRONT-WHEEL-DRIVE MOTOR VEHICLE

Application filed September 24, 1928. Serial No. 307,985.

This invention relates to motor vehicles and particularly to that type thereof in which both the driving and steering is accomplished though the front wheels, the principal object being the provision of a new and novel connection between the front wheels and differential or other common driving mechanism.

Another object is to provide means for transmitting the power to the front wheels from a common driving member such that the angularity of the wheels in steering and in the springing of the vehicle imposes a minimum of strain upon the driving connections.

Another object is to provide a front wheel drive mechanism for motor vehicles in which each of the driving connections between the differential or other common driving means and the wheels includes at least three universal joints.

Another object is to provide a front wheel drive mechanism for motor vehicles in which the line of shafting between the differential mechanism and each wheel includes a universal joint adjacent the differential mechanism and two universal joints at each wheel, the last mentioned universal joints being positioned on opposite sides of the line of pivot of the corresponding wheel.

Another object is to provide a wheel spindle and a wheel hub construction for front wheel drive motor vehicles which will permit a reduction in the size thereof over conventional constructions without in any way impairing the strength thereof.

A further object is to provide a wheel spindle construction for front wheel drive motor vehicles including a hollow spindle within which a drive shaft is rotatably received, bearing rollers being interposed between the drive shaft and the wheel spindle without the interposition of separate bearing races, a wheel hub being rotatably mounted on the exterior of the spindle and being provided with bearing rollers in substantial alignment with the first mentioned bearing rollers, the last mentioned bearing rollers bearing directly upon the wheel spindle without the interposition of a separate bearing race, and a combined radial and thrust bearing being provided between the spindle and the hub at a point remote from the last mentioned bearing rollers.

The above being among the objects of the present invention, the same consists in certain features of construction and combination of parts to be hereinafter described with reference to the accompanying drawings, and then claimed, having the above and other objects in view.

In the accompanying drawings which illustrate a suitable embodiment of the present invention and in which like numerals refer to like parts throughout the several different views,—

Fig. 1 is a more or less diagrammatic front view of a front wheel and axle assembly for front wheel drive motor vehicles.

Fig. 2 is an enlarged fragmentary sectional view taken vertically through the transmission and differential housing in line with the center of the axle shafts, and showing the connection between the differential mechanism and the axle shafts.

Figure 3:
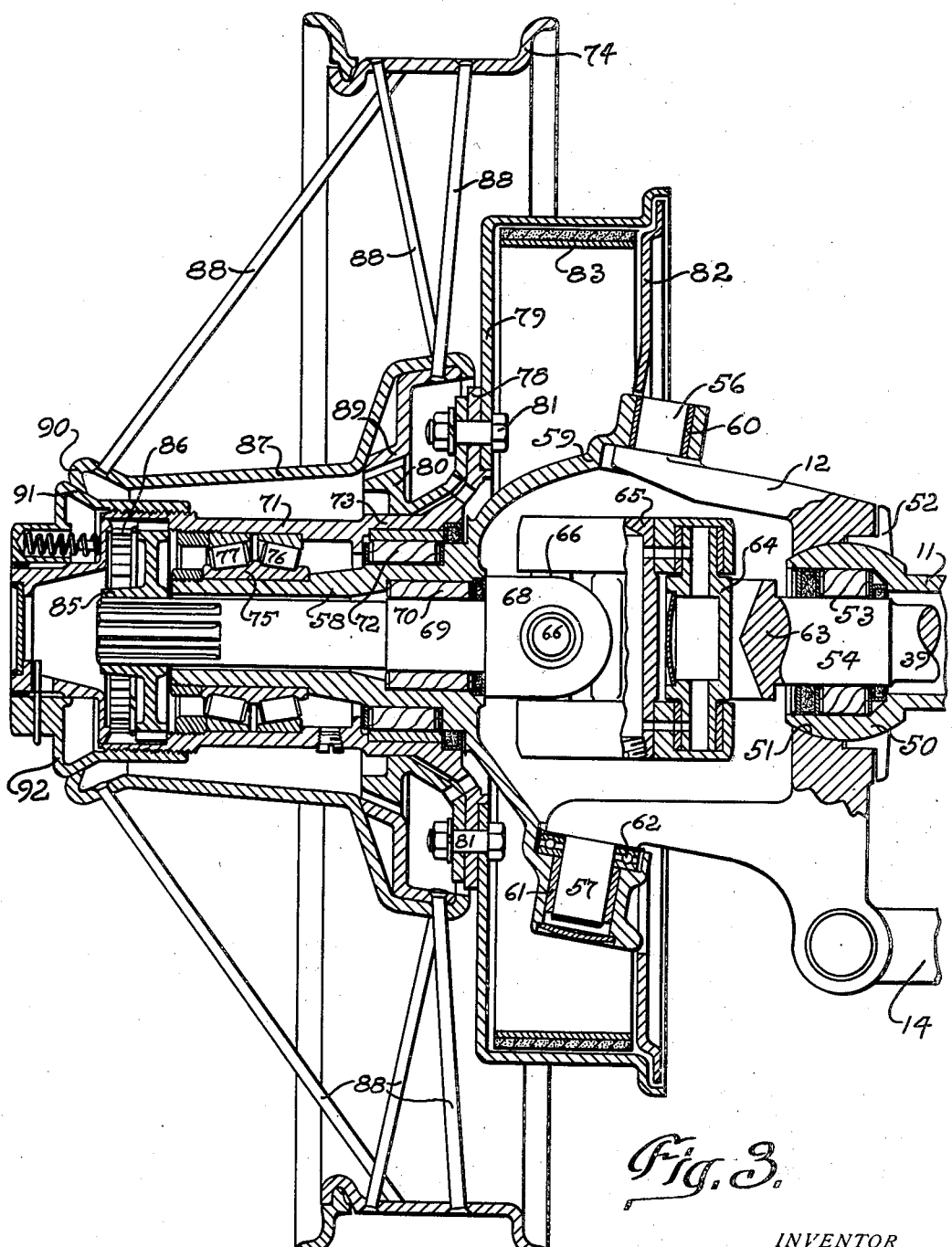
Fig. 3 is an enlarged vertical sectional view taken centrally through the front wheel showing the driving connections between the axle shaft and front wheel.

In the conventional front wheel drive constructions, two universal joints at the most are employed in the line of shafting between the differential mechanism and each front wheel. I have found that two universal joints in this connection are insufficient for practical purposes in that it subjects such connection to too rapid wear and to too high stresses during operation. This is caused by the fact that when the wheels are turned during steering movement out of perpendicular relationship with respect to the axle shafts and at the same time the line of shafting is moved in a vertical plane due to springing of the vehicle, the angularity of the wheel joint becomes so great that undue stresses are set up in it during transmission of power through it. The result is that in conventional constructions employing but a single universal joint at each wheel, such universal joint is quickly worn out and is often broken due to the excessive stresses present during the periods of operation as above described. Furthermore, when but one universal joint is employed at the wheel end of the axle shafts during turning of the wheels in a steering movement an unequal angular velocity is attempted to be transmitted from the universal joint to the wheel hub which gives rise to obvious disadvantages.

In accordance with the present invention I provide in the line of shafting between the differential mechanism and each wheel three universal joints, one of which is positioned adjacent the differential mechanism and two of which are positioned adjacent the wheel, those positioned adjacent the wheel being positioned on opposite sides of the line of wheel pivot. The result is that under those conditions during which the single universal joint employed at the wheel in conventional constructions is subjected to excessive stresses due to excessive angularity of the joint parts, the angularity of the joint parts in the present invention are only half of that present in conventional constructions, with the result that the stresses are materially decreased and in fact to such an extent as to make a practical and long-lived construction. Furthermore, in positioning the two joints on either side of the pivot point of the wheel, the fluctuating angular velocity present in conventional constructions during turning of the wheel is neutralized in the present case by the second joint.

Another difficulty of conventional constructions is that in order to provide ample bearing for the wheel, the constructions have resulted in a wheel hub of abnormally large size, resulting in the necessity of employing wheels with specially designed hubs in order to be received on the wheel spindles. Furthermore, in conventional constructions where it has been attempted to reduce the size of the hub to a point sufficient to receive thereon standard sizes of wheel hubs, it has necessitated the reduction of the bearing area to an extent not commensurate with the load to be carried by the bearings. In accordance with the present invention I provide a spindle and hub construction so designed as to permit the employment of more than ample bearing surfaces for carrying the load imposed, and permitting reduction of the dimensions to such an extent as to enable standard sized wheel hubs to be received thereon.

Referring to the drawings and particularly to Fig. 1, I show a front wheel drive mechanism comprising a combined transmission and ring gear housing 10 which, as shown in Fig. 2, includes a mechanism shown and described in my patent application for Letters Patent of the United States for improvements in power transmission mechanism, serially numbered 256,538, filed February 24th, 1928. Axle housings 11 universally connected to the housing 10 at their inner ends extend outwardly therefrom and are each universally connected at their outer ends to a member 12 to which the corresponding wheel spindle is pivotally connected. The casing 10 is provided with a lower cover 13 rigidly secured thereto and which is pivotally connected by a link 14 to the member 12 at a point spaced a material distance below the point which the housings 11 are connected thereto. The member 12 is therefore connected to the housing 10 by a parallel link motion which serves to maintain the wheel in a predetermined vertical position at all times. In the construction shown, the axle housings 11 extend through openings 15 formed in the chassis frame side members 16, it being understood that the housing 10 is rigidly secured relative to the frame 16 by means not shown. The springing of the wheels 17 relative to the frame 16 may be accomplished in any desired manner, that shown comprising a transverse leaf spring 18 secured to a pad 19 formed on the housing 10 and having its opposite ends connected to the opposite members 12 by means of suitable shackles 20. Suitable means such as radius rods (not shown) are of course provided to prevent rotation of the members 12 about their axes.

Referring to Fig. 2 it will be seen that in accordance with my previous patent application above referred to, the housing 10 is provided with a bearing yoke 21 in which is secured a roller bearing 24 by a cap 25 and screws 26. Rotatably mounted in the bearing 24 is a differential housing member 27 rotatably supporting therein the usual differential gears 28, 29 and 30 in a conventional manner. The differential housing 27 is provided with a tubular extension 31 which extends across the housing 10 and is rotatably supported at its other end in suitable bearings (not shown). The differential housing 27 has secured thereto the usual ring gear 33 which is driven by a pinion 34 secured to a transmission shaft 35, the transmission shaft 35 extending over the top of the tubular extension 31 of the differential housing as shown and as made possible by the use of hypoid types of ring gear and pinion, as clearly set forth in my previous patent application above referred to. Non-rotatably secured to the gear 28 by a splined connection is one yoke 36 of a universal joint having a cross 37 and a second yoke 38. The axle shaft 39 is non-rotatably secured to the yoke 38 by a splined connection. The differential gear 29 has non-rotatably secured thereto by a splined connection a shaft 40 which extends through the tubular extension 31 and is connected at its opposite end to a universal joint similarly positioned with respect to the housing 10 as is the universal joint just described and which is connected to the corresponding wheel on its side of the vehicle in the same manner as is the wheel which will be presently described.

Secured to the side face of the housing 10 by bolts such as 41 are a pair of members 42 and 43 having spherically projecting parts spaced from each other and between which is slidably received the spherically-shaped end 45 at the inner end of the axle housing 11. The cap 13 which closes the lower face of the housing 10 and which upon removal permits the transmission and differential mechanism to be removed from the housing 10 is provided with flanges 46 terminating in eyes 47 in which the pins 48 connecting the cap 13 to the links 14 are rotatably received, bushings such as 49 being preferably provided for the pins 48.

Referring now to Fig. 3 which shows the connection between the outer end of the shaft 39 and the wheel, it will be observed that the outer end of the axle housing 11 is provided with a spherical end 50 which is received against the spherical seat 51 formed in the member 12 and is secured therein against axial movement by a nut member 52 also provided with a spherical seat. Within the housing 11 is positioned roller bearings 53 without the interposition of bearing races, and the shaft 39 is enlarged as at 54 and is rotatably received within the roller bearings 53 without the interposition of a bearing race. By eliminating the bearing races at these points the diameter of the spherical end 50 is permitted to be made of minimum dimensions and the shaft 39 at this point of maximum dimensions without in any way effecting the required bearing area for the shaft 39. I have found that use of bearing races at this point is not necessary because of the fact that the housing 11 and shaft 39 may be suitably treated to provide bearing surfaces of ample hardness so that they themselves serve as races.

The member 12 which is of yoke-like construction is provided on its upper arm with an upwardly extending pin 56 and on its lower arm with a downwardly extending pin 57. A hollow wheel spindle 58 is provided with an enlarged bell portion 59 which encircles the pins 56 and 57 with suitable bearings 60 and 61 interposed between them at such points. A thrust bearing 62 is provided around the lower pin 57 to take the usual thrust present at this point. The portion 59 at either the pin 56 or 57, or both, may be provided with a removable cap to permit assembly and disassembly of the member 12 and spindle 58. The shaft 39 is provided with a yoked end 63 in which is rotatably received two arms of the cross 64 and the other two arms of which are received in the block assembly 65 which in turn rotatably receives two arms of the cross 66, the other two arms of which are rotatably received in the yoke 68 formed on the inner end of the shaft 69. The shaft 69 at the inner end of the spindle 58 is rotatably supported therein by the bearing rollers 70 interposed between the shaft 69 and spindle 58 without the employment of bearing races of any type whatsoever. This permits the spindle 58 at this point to be made of minimum dimensions and the shaft 69 of maximum dimensions without reducing the bearing area necessary in any manner whatsoever, resulting in advantages which will be presently described. It may be noted at this point that the universal joints just described are positioned on opposite sides of the axial lines of the pins 56 and 57 which, of course, are in axial alignment.

A hub member 71 is rotatably mounted on the spindle 58 in the following manner: Bearing rollers 72 bearing directly on the exterior face of the spindle 58 in substantial alignment with the bearing rollers 70 are interposed between the spindle 58 and the bearing race 73 secured to the inner face of the hub member 71 at this point. It may be noted here that the bearing rollers 70 and 72 lie substantially in the central plane of the wheel rim 74. Outwardly of the bearings 72 is a bearing assembly 75 including two series of oppositely inclined bearing rollers 76 and 77 respectively, which bearing assembly is secured in place in a conventional manner and which not only serves to transmit radial loads but also serves to take up the thrust between the wheel and the spindle.

The inner end of the hub member 71 is provided with a flange 78 to which the brake drum 79 and wheel hub bearing member 80 is secured by means of bolts 81. The brake drum 79 may be provided with the usual dust cover 82 closing its open face and suitably mounted upon the spindle 58. The drum is, of course, provided with the usual brake bands or shoes 83 which may be of any conventional construction and operated in any suitable manner. The hub member 71 is secured to the shaft 69 for equal rotation therewith in the following manner: A gear-like member 85 is splined to the outer end of the shaft 69 and its outer toothed face is received in the splined end 86 of the hub member 71, thus locking the hub member 71 and shaft 69 for equal rotation. The wheel shown is of a conventional type of wire wheel in which the rim 74 is connected to a hub sleeve 87 by means of wire spokes 88. The inner end of the sleeve 87 is provided with a member 89 having a beveled face adapted to engage the member 80 secured to the hub 71 and a beveled outer face 90 which is engaged by the beveled face 91 of the cap 92 which is threaded on to the exterior of the hub 71 in the manner shown to lock the wheel to the hub. Other features including the means for locking the cap 92 against movement are of conventional construction and no explanation of the same is deemed necessary.

It is particularly important to note that by the elimination of inner and outer races for the roller 70 and inner race for the rollers 72, the hub 71 may be made of sufficiently small dimensions as to be capable of receiving thereon a wheel hub of standard dimension such as employed in conventional types of motor vehicles now in use. This aids in reducing the special equipment necessary for the production of a front wheel drive motor vehicle employing the particular construction disclosed. It will also be obvious that by employing the dual universal joints at the front wheels, the angularity of the parts of each of the joint is materially reduced during steering and vehicle springing movements over that of conventional constructions wherein but a single universal joint is employed at the wheel, and that the stresses to which these parts are subjected is correspondingly reduced. Furthermore, any fluctuations of the angular velocity of the wheel induced by the angularity of the joint parts is materially reduced by the employment of the second joint which acts to offset such fluctuations in the first joint. Other advantages of the construction disclosed are, of course, obvious to those skilled in the art.

It will also be obvious that although a single embodiment of the present invention is disclosed in the drawings the invention involved is capable of various modifications, and formal changes may be made in the specific embodiment of the invention described without departing from the spirit or substance of the broad invention, the scope of which is commensurate with the appended claims.

What I claim is:

1. In combination with a motor vehicle, a frame, a housing rigidly mounted with respect to said frame, drive mechanism within said housing, a tubular housing member projecting outwardly from each side of the first mentioned housing in a direction transversely of said vehicle, said tubular housing members being fixed against axial movement relative to the first mentioned housing and being universally movable with respect thereto, a yoked member fixed against relative axial movement to the outer end of each of said tubular housing members and universally movable with respect thereto, a rigid link pivotally connecting each of said yoked members with the first mentioned housing, each of said links being positioned in spaced but parallel relationship with the corresponding of said tubular housing members, a wheel spindle pivotally mounted on each of said yoked members, a wheel rotatably mounted on each of said spindles, and a driving connection between said drive mechanism and each of said wheels extending through said tubular housing members.

2. In a combination with a motor vehicle, a frame, a housing fixed with respect to said frame, drive mechanism within said housing, a tubular housing member projecting outwardly from each side of the first mentioned housing in a direction transversely of said vehicle, said tubular housing members being fixed against axial movement relative to said first mentioned housing and being swingable relative thereto in an approximately vertical plane, a yoked member fixed against axial movement to the outer end of each of said tubular housing members and movable relative thereto in an approximately vertical plane, a rigid link pivotally connecting each of said yoked members with said first mentioned housing, each of said links being positioned in approximately parallel and in spaced relation with the corresponding of said tubular housing members, a wheel spindle pivotally secured to each of said yoked members, a wheel rotatably mounted on each of said spindles, and a driving connection between each of said wheels and said drive mechanism, said connections extending through said tubular members and each including a universal joint.

ROSCOE C. HOFFMAN.